United States Patent
Iijima et al.

(10) Patent No.: US 8,488,049 B2
(45) Date of Patent: Jul. 16, 2013

(54) IMAGE PICKUP APPARATUS, CONTROL METHOD THEREOF, AND PROGRAM

(75) Inventors: Ryunosuke Iijima, Yokohama (JP); Yusuke Fujita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/302,011

(22) Filed: Nov. 22, 2011

(65) Prior Publication Data

US 2012/0147245 A1 Jun. 14, 2012

(30) Foreign Application Priority Data

Dec. 8, 2010 (JP) ................................ 2010-273564

(51) Int. Cl.
*H04N 5/232* (2006.01)

(52) U.S. Cl.
USPC .......................................... 348/345; 348/346

(58) Field of Classification Search
USPC ................ 348/345–357; 396/79–83, 89–152
See application file for complete search history.

(56) References Cited

U.S. PATENT DOCUMENTS

| | | | |
|---|---|---|---|
| 2006/0017835 A1* | 1/2006 | Jacobsen | 348/345 |
| 2008/0068487 A1* | 3/2008 | Morita | 348/333.05 |
| 2008/0129857 A1* | 6/2008 | Vau et al. | 348/345 |
| 2009/0009652 A1* | 1/2009 | Sudo et al. | 348/349 |
| 2011/0249150 A1* | 10/2011 | Shintani et al. | 348/240.3 |

FOREIGN PATENT DOCUMENTS

JP 2007-088655 4/2007

* cited by examiner

*Primary Examiner* — Tuan Ho
*Assistant Examiner* — Chan Nguyen
(74) *Attorney, Agent, or Firm* — Cowan, Liebowitz & Latman, P.C.

(57) ABSTRACT

An image pickup apparatus sets focusing time for changing an in-focus state onto each in-focus point by the optical system in accordance with a plurality of in-focus points set by a setting unit and controls the change of the in-focus state by the optical system on the basis of the set focusing time and evaluation by a focus estimation unit in response to a recording instruction given to a recording unit, so that the plurality of set in-focus points are made intop the in-focus state in turn.

9 Claims, 7 Drawing Sheets

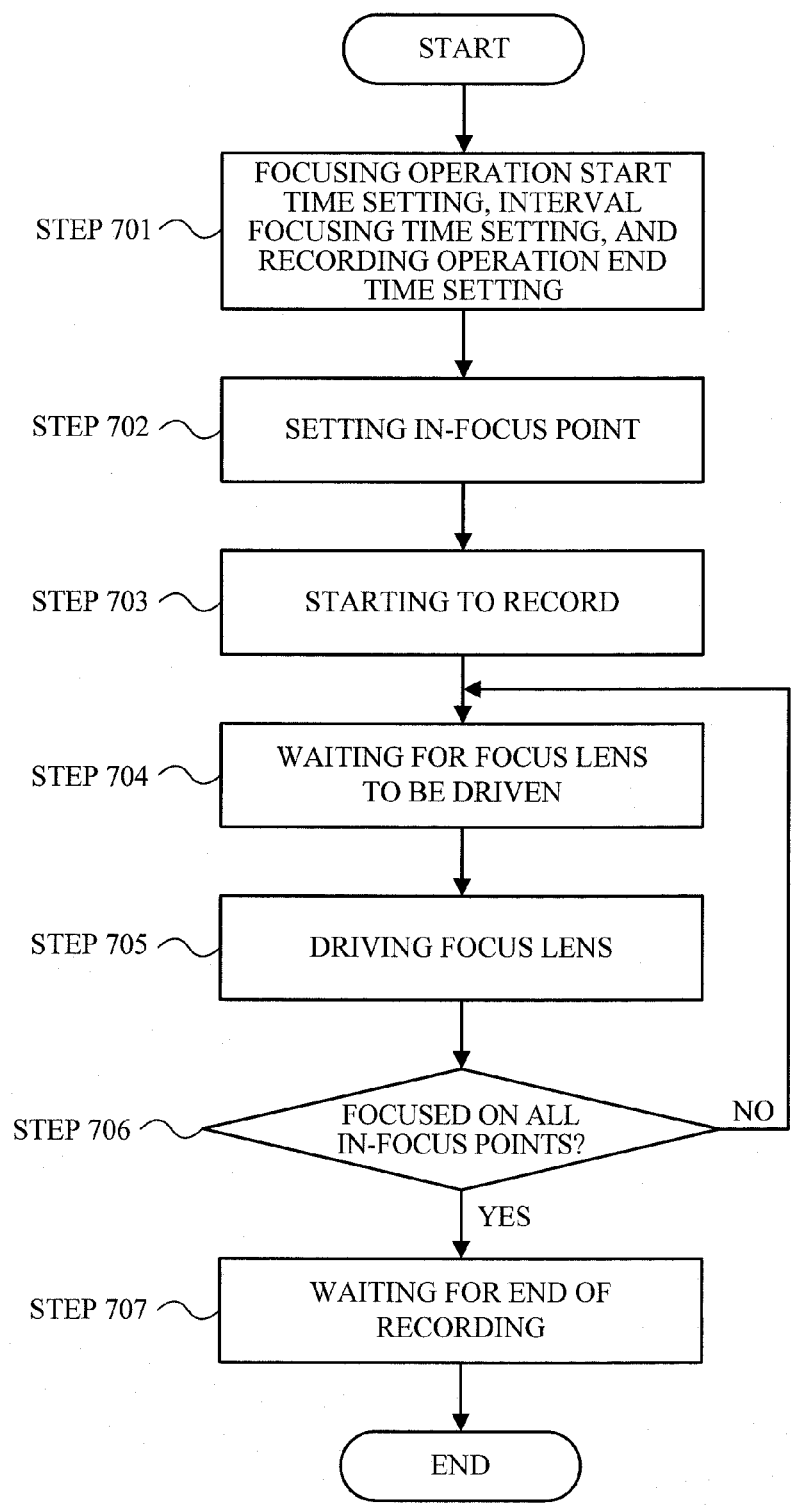

IMAGE PICKUP APPARATUS, CONTROL METHOD THEREOF, AND PROGRAM

BACKGROUND OF THE INVENTION

1. Field of the Invention

The present invention relates to an image pickup apparatus, a control method thereof, and a program.

2. Description of the Related Art

In recent years, some of image pickup apparatuses such as digital image cameras, digital still cameras and the like have a function that when a photographer selects an arbitrary point on an object, the selected point is automatically made into an in-focus state (for example, Japanese Patent Application Laid-Open No. 2007-088655).

In this function, when a new point is selected while focusing operation is being performed on the selected point of the object, the focusing operation being executed on the previously selected point is stopped every time selection is made, and the focusing operation is then started on the newly selected point.

However, the above-described example of the conventional technique is arranged such that an arbitrary point designated by a user is made into an in-focus state first, and thereafter, every time another point is designated, focusing operation on the designated point is repeated. Therefore, there exist following problems in the conventional technique. When a user wants to intentionally take and make use of an out-of-focus image obtained while focus is successively made on plural points of the object, the user has to manipulate a key switch or a touch panel, which may cause camera vibration.

When the focusing operation is automatically performed to change the current in-focus state to that of other arbitrary point, there is a problem that the in-focus time cannot be set flexibly line a manual focus operation.

SUMMARY OF THE INVENTION

A scope of the invention is to provide an image pickup apparatus capable of solving the above problems associated with the conventional technique. According to an aspect of the present invention, the image pickup apparatus is configured to set a focusing time for changing an in-focus state onto each in-focus point by the optical system in accordance with plural in-focus points being set by a setting unit, and control change of the in-focus state by the optical system on the basis of the set in-focus time and evaluation by a focus estimation unit in response to a recording instruction given to a recording unit, so that plural set in-focus points are made into the in-focus state in turn and thus the problems associated with conventional techniques are solved.

Further features of the present invention will become apparent from the following description of exemplary embodiments with reference to the attached drawings.

BRIEF DESCRIPTION OF THE DRAWINGS

FIG. 7 is a figure illustrating a flowchart of recording operation of the image pickup apparatus according to the second embodiment of the present invention.

DESCRIPTION OF THE EMBODIMENTS

Preferred embodiments of the present invention will now be described in detail in accordance with the accompanying drawings.

First Embodiment

Figure 1:
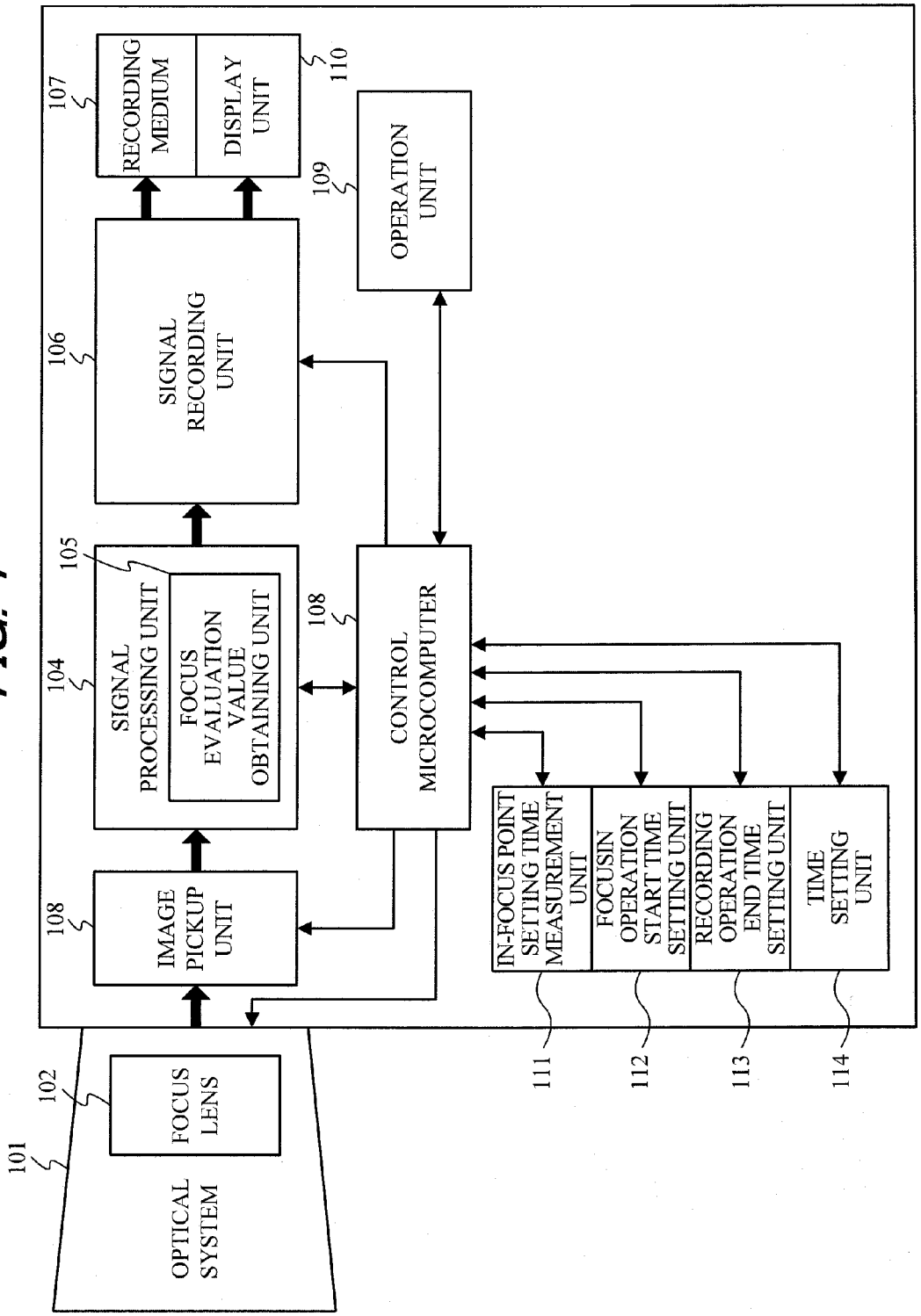
FIG. 1 is a figure illustrating processing blocks in an image pickup apparatus according to the present invention.

FIG. 1 is a figure illustrating processing blocks in an image pickup apparatus according to the first embodiment of the present invention.

In FIG. 1, numeral 101 denotes an optical system including a zoom lens group, an iris, a Neutral Density (ND) filter, and the like. Numeral 102 denotes a focus lens. Numeral 103 denotes a photographing unit including a CCD, i.e., image pickup element, a sample/hold circuit (S/H) circuit, a pre-processing circuit, and the like. Numeral 104 denotes a signal processing unit. Numeral 105 is a focus estimation value obtaining unit. Numeral 106 denotes a signal recording unit. Numeral 107 denotes a recording medium such as a flash memory, an optical disk, a tape, and the like. Numeral 108 denotes a control microcomputer for controlling the entire image pickup apparatus. Numeral 109 denotes an operation unit constituted by key switches, a touch panel, or the like.

A display unit 110 is constituted by a liquid crystal panel and the like, and displays an image signal so that a user confirms an object.

The light amount of light received from an object through a lens via the optical system 101 is adjusted by an iris and an ND filter. In the image pickup unit 103, the light from the object forms an image on a light receiving surface of an image pickup element such as a CCD, and is accumulated as image signal charges through photoelectric conversion. The image signal that is output from the image pickup element such as a CCD is sampled/held by the sample/hold circuit, and thereafter supplied to the pre-processing circuit, in which AGC processing, black balance processing, white balance processing, gamma correction processing, and the like are performed on the signal. Then, the processed signal is supplied to the signal processing unit 104. The signal processing unit 104 performs processing and correction and the like on the image signal in accordance with the instructions given by the control microcomputer 108, and the processed/corrected image signal is output to the signal recording unit 106.

The signal recording unit 106 performs intra-frame encoding or inter-frame encoding on the received image signal, and records the encoded signal to the recording medium 107.

The operation unit 109 is constituted with key switches, a touch panel, or the like, and transmits operation performed by a user to the control microcomputer 108.

The focus estimation value obtaining unit 105 includes a signal processing unit for obtaining contrast of the image signal and a phase difference sensor for dividing the light incident from the optical system 101 and obtaining a phase difference between the two lights, or the like.

In focus adjustment of contrast obtaining type, the sharpness of an object image formed by the optical system 101 is obtained by estimating an output of a solid image pickup element using a predetermined function, and a position of an image pickup optical system on an optical axis is adjusted so that the sharpness has an extreme value. Examples of evaluation functions include a function for adding, within a focus detection area, absolute values of differences between luminance signals of frames adjacent to each other and a function for adding, within the focus detection area, squares of differences between luminance signals of frames adjacent to each other. There is another evaluation function in which differences of signals between frames adjacent to each other are processed for each of the pixel signals of R, G, and B in a similar to the above-described manner.

In general, in this type of focus detection according to the contrast detection method, while the position of the optical system 101 on the optical axis is being moved by slightly moving the focus lens 102, the evaluation function value is obtained. Therefore, it takes a long time to adjust focus until in-focus state is obtained.

In a case where the focus estimation value obtaining unit 105 is constituted by the phase difference sensor and the like, two light fluxes having passed through different pupil areas of the image pickup optical system are used to respectively form object images, and a positional phase difference between the two object images is detected based on the output of the image pickup element. Then, this phase difference is converted into the defocus amount of the image pickup optical system. In the focus detection according to this method, the defocus amount can be obtained. Therefore, there is an advantage in that it takes a much shorter time to obtain the in-focus state than the contrast detection method.

A result obtained by evaluating the focusing state (in-focus state) using these methods is transmitted to the control microcomputer 108 as a focus estimation value. The control microcomputer 108 calculates the drive amount of the focus lens 102 on the basis of the received focus estimation value, and gives an instruction to the optical system 101 to drive the focus lens 102. Numeral 111 denotes an in-focus point setting time measurement unit, which measures a time for setting a time from start to end of the focusing operation for the selected in-focus point. Numeral 112 denotes a focusing operation start time setting unit, which sets a time from start of waiting state of the focusing operation to start of the focusing operation. Numeral 113 denotes a recording operation end time setting unit, which sets a time from when the focusing operation for all the in-focus points is completed to when recording is ended. Numeral 114 denotes a time setting unit, which provides an operation unit to a user so that the user transmits a desired time to the control microcomputer 108.

Figure 2:
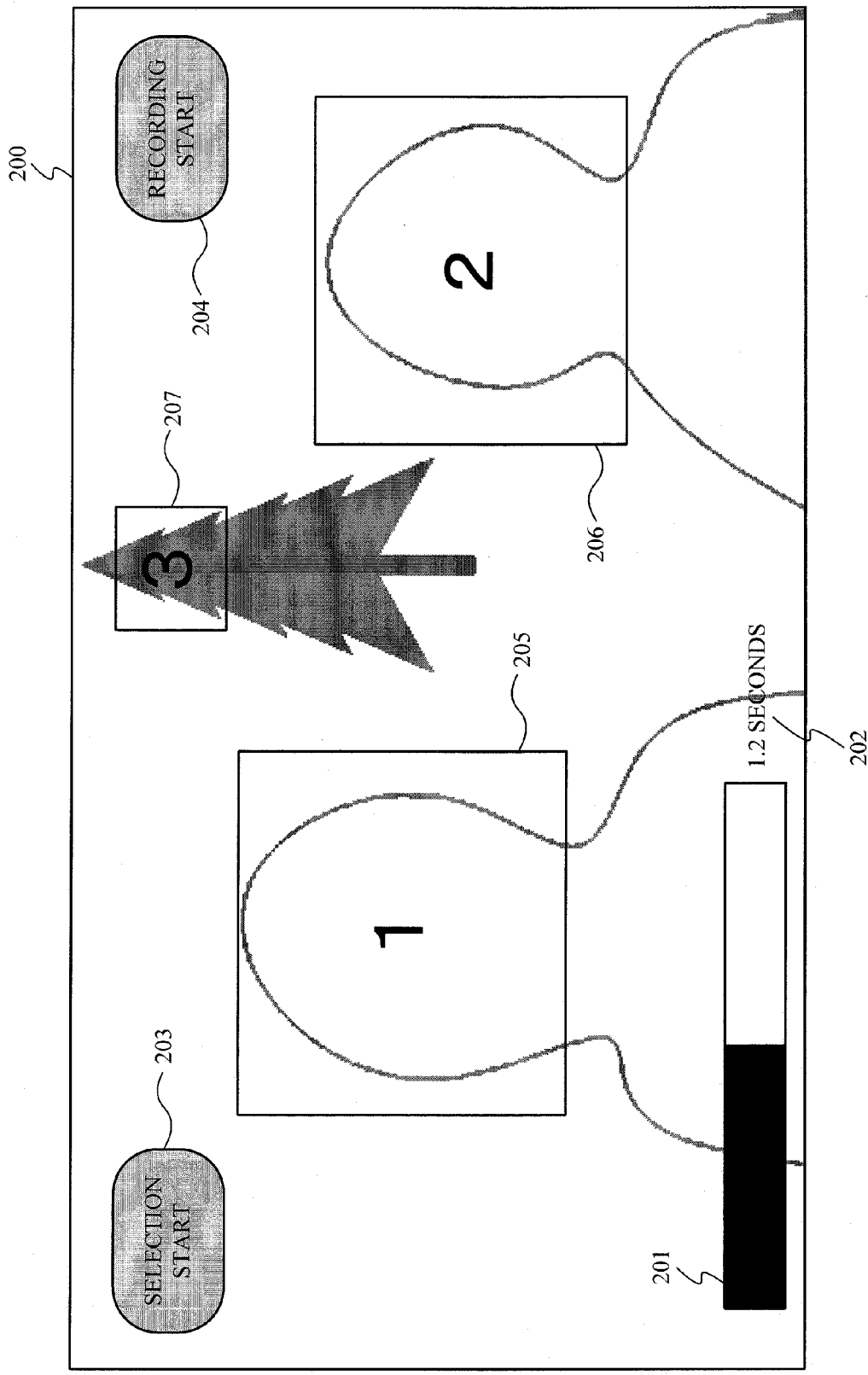
FIG. 2 is a figure illustrating an example of display of an in-focus point setting screen according to the first embodiment of the present invention.

Subsequently, setting configuration of focusing operation to be performed by the image pickup apparatus according to the present embodiment will be explained. This operation is achieved when a user manipulates the operation unit 109. In the present embodiment, however, at least a portion of the operation unit 109 is configured with the touch panel. In this case, the touch panel is integrally formed with the display unit 110, and detects a position touched with a finger of a user when the user touches such as button icons 203 and 204 displayed on a display screen 200 as shown in FIG. 2. Operation of each unit is controlled by the control microcomputer 108, and in this case, the control microcomputer 108 loads and executes a program stored in a memory not shown, thus achieving the controls described hereinafter.

First, when a user manipulates the operation unit 109 to make the in-focus setting state effective, recording processing routine including in-focus point setting is activated, and the control microcomputer 108 gives an instruction to the focusing operation start time setting unit 112 to start measuring the time. Thereafter, the control microcomputer 108 obtains an elapsed time from the focusing operation start time setting unit 112, and gives an instruction to the display unit 110 to display the elapsed time and the current elapsed time of the measurable time. FIG. 2 shows an example of this display.

As shown at the lower left of FIG. 2, an elapsed time 202 and a progress bar 201 indicating the current elapsed time of the measurable time are superimposed on a photographed image and displayed.

The user confirms the display concerning the elapsed time and touches a selection start icon 203 to give an instruction to start selecting an in-focus point. If the touch panel is not used, the user gives an instruction by manipulating switches and the like. If no selection operation is performed even after the measurable time passes, the focusing operation start time setting unit 112 is instructed to start the time measurement all over again. When the selection start icon 203 is touched to give the instruction to start selecting an in-focus point, the control microcomputer 108 obtains the elapsed time from the focusing operation start time setting unit 112 to store the obtained elapsed time as a focusing operation start time 1, and gives an instruction to the in-focus point setting time measurement unit 111 to start measuring the time.

Thereafter, the control microcomputer 108 obtains the elapsed time from the in-focus point setting time measurement unit 111, and gives an instruction to the display unit 110 to display the elapsed time and the current elapsed time of the measurable time. The format of display may be the same as that used by the focusing operation start time setting unit 112, but it is preferably displayed so that the setting time can be distinguished by appearance.

The user confirms the display concerning the elapsed time, and selects the first in-focus point at any desired timing. If no selection operation is performed even after the measurable time passes, the in-focus point setting time measurement unit 111 is instructed to start the time measurement all over again.

When the user touches a position 1 shown in FIG. 2, the control microcomputer 108 obtains the position selected by the user from the operation unit 109, and displays a selection frame 205 on the display unit 110 as shown in FIG. 2. The touched position 1 is stored as an in-focus point 1 of an object on which focus is to be made. At the same time, the control microcomputer 108 obtains the elapsed time from the in-focus point setting time measurement unit 111 to store the obtained elapsed time as an interval focusing time 1, and instructs the focusing operation start time setting unit 112 and the recording operation end time setting unit 113 to start measuring the time.

Thereafter, the control microcomputer 108 obtains the elapsed time from any one of the focusing operation start time setting unit 112 and the recording operation end time setting unit 113. Then, the display unit 110 is instructed to display the elapsed time and the current elapsed time of the measurable time according to the display format as described above.

The user confirms the display concerning the elapsed time, touches the selection start icon 203 at any desired timing when the user wants to select a subsequent in-focus point to give an instruction to start selecting an in-focus point again. At this occasion, the control microcomputer 108 obtains the elapsed time from the focusing operation start time setting unit 112 to store the obtained elapsed time as a focusing operation start time 2. Thereafter, the above procedure of the in-focus point setting is repeated. Where the number of times of in-focus point settings is denoted with n, a focusing operation start time n obtained from the focusing operation start time 1, an interval focusing time n obtained from the interval focusing time 1, and an in-focus point n obtained from the in-focus point 1 are stored as results.

When the user wants to terminate the setting of the in-focus point, the user confirms the display concerning the elapsed time, and gives a recording start instruction at any desired timing. This instruction is given by touching a recording start icon 204 as shown at the upper right of FIG. 2.

When the user gives the instruction to start recording, the control microcomputer 108 obtains the elapsed time from the recording operation end time setting unit 113 to store the obtained elapsed time as the recording operation end time.

According to the start of recording instruction given by the user, the control microcomputer 108 gives an instruction of start of recording operation to start recording the image signal to the recording medium 107. When the set focusing operation start time 1 has passed since the start of recording, the control microcomputer 108 derives a difference between the current focus position and the in-focus point 1. Then, based on the difference, the control microcomputer 108 derives the focus lens drive amount for changing the in-focus point from the current focus position to the in-focus point 1 in the set interval focusing time 1, and starts driving the focus lens.

Now, the drive configuration of the focus lens will be explained according to which of the above-described different focus estimation configurations the focus estimation value obtaining unit 105 having.

When the focus estimation value obtaining unit 105 is constituted by a phase difference sensor and the like, the defocus amounts of the current in-focus point and the set in-focus point 1 are obtained. The required drive amount of the focus lens 102 is derived from the difference of the obtained defocus amounts. Thereafter, the focus lens drive amount per unit time for driving the focus lens 102 at a constant focusing speed over the interval focusing time 1 is obtained from the required drive amount of the focus lens 102 and the interval focusing time 1.

Further, if the focus estimation value obtaining unit 105 is configured to extract the contrast from the image signal to obtain the focus estimation value based on this contrast, the following drive configuration is employed. First, the focus lens 102 is driven in advance when the user sets the in-focus point or gives the instruction to start recording, and the focus lens position at which the focus estimation value becomes the maximum is obtained with respect to each in-focus point. Subsequently, the required drive amount of the focus lens 102 is derived from the difference of the focus lens position correspondingly to each in-focus point obtained. Thereafter, the focus lens drive amount per unit time for driving the focus lens 102 at a constant focusing speed over the interval focusing time 1 is obtained from the required drive amount of the focus lens 102 and the configured interval focusing time 1.

It should be noted that the reason why the focus detection according to the contrast detection method requires actually driving the focus lens 102 in advance and storing the focus lens position at which the focus estimation value becomes the maximum for each in-focus point is following one. In the contrast detection method, while the position of the optical system 101 on the optical axis is being moved by slightly moving the focus lens 102, the evaluation function value is obtained. Thus, when the constant focusing speed is maintained over the interval focusing time 1, the above movement may pass the position of the extreme value of the evaluation function value, and it may be impossible to correctly obtain the extreme value.

After the set interval focusing time 1 passes, the driving of the focus lens is stopped, and the control microcomputer 108 waits until the set focusing operation start time 2 passes. When the focusing operation start time 2 (waiting time) passes since the driving of the focus lens is stopped, the control microcomputer 108 derives the difference between the in-focus point 1 and the in-focus point 2. Then, the control microcomputer 108 derives the focus lens drive amount for changing the in-focus point from the in-focus point 1 to the in-focus point 2 in the interval focusing time 2, and starts driving the focus lens.

These operations are repeated up to the in-focus point n. When the focus lens has been driven to the in-focus point n, the control microcomputer 108 waits until the set recording operation end time passes. When the recording operation end time passes, the control microcomputer 108 gives an instruction to stop recording, thereby stopping recording of the image signal to the recording medium 107.

Figure 3:
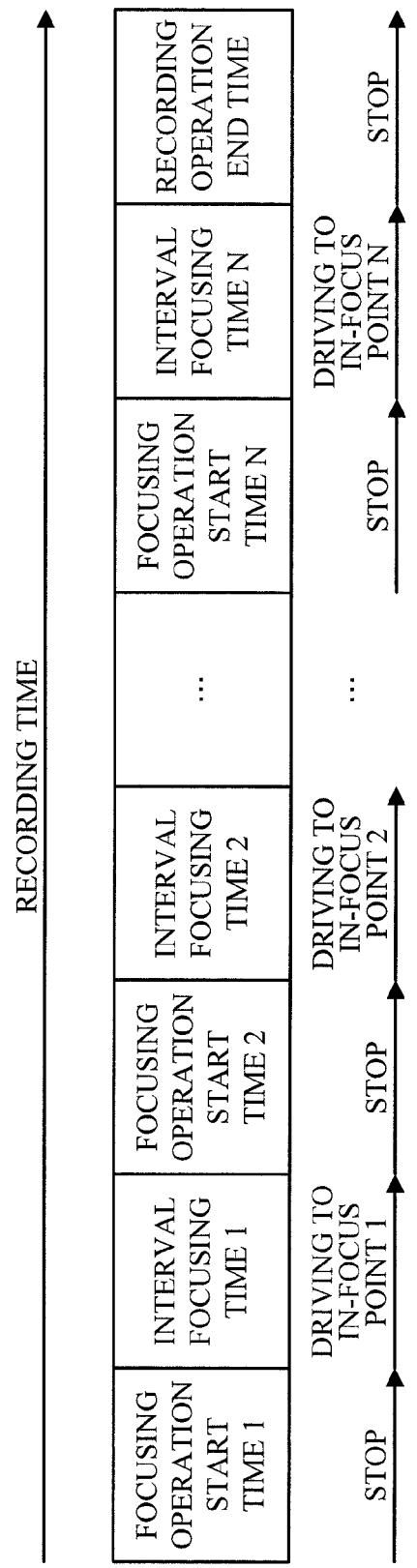
FIG. 3 is a figure illustrating relationship in terms of time, among a recording time, a focusing operation start time, an interval focusing time, and a recording operation end time according to the present invention.

FIG. 3 illustrates relationship in terms of time, among the recording time, the focusing operation start time, the interval focusing time, and the recording operation end time which are configured in the present invention.

As shown in the figure, automatic focus operation is successively executed based on the focusing operation start time n obtained from the focusing operation start time 1, the interval focusing time n obtained from the interval focusing time 1, and the in-focus point n obtained from the in-focus point 1 stored based on user operation, and the recording operation end time. As a result, the image pickup apparatus can record a image up to the recording time end time as one clip.

Figure 4:
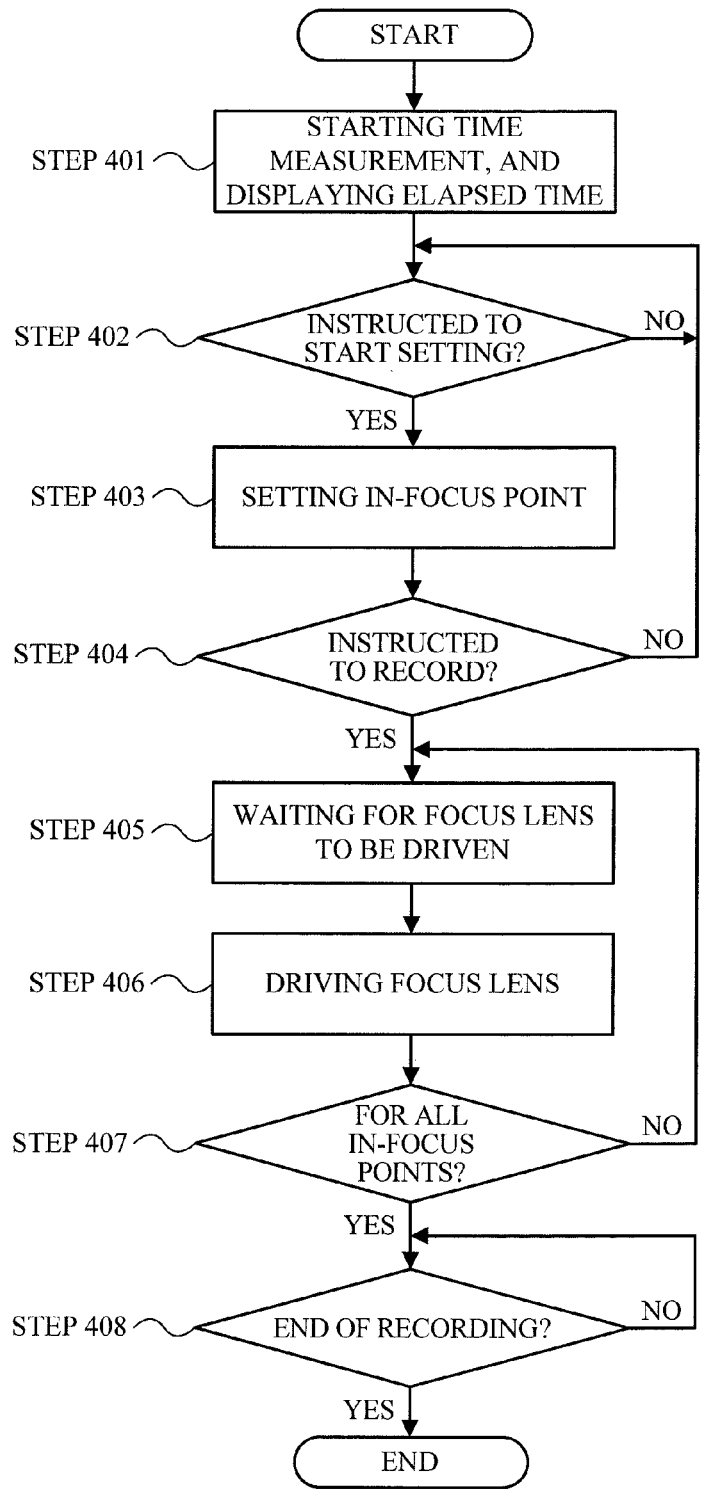
FIG. 4 is a figure illustrating a flowchart of recording operation performed by the image pickup apparatus according to the first embodiment of the present invention.

FIG. 4 illustrates a flowchart illustrating the recording operation including setting of the in-focus points performed by the image pickup apparatus according to the first embodiment of the present invention.

The recording operation routine according to the present embodiment is started (activated) when the user manipulates the operation unit 109 to enable the in-focus point setting state.

In Step 401, the control microcomputer 108 gives an instruction to the focusing operation start time setting unit 112 to start measuring the time, and gives an instruction to the display unit 110 to display the elapsed time and the current elapsed time of the measurable time (FIG. 2).

Subsequently, in Step 402, a determination is made as to whether the user has given an instruction to start selecting in-focus point.

When the instruction to start selecting in-focus point is determined to have been given, processing required for setting in-focus point is executed in Step 403. In other words, the control microcomputer 108 obtains the focusing operation start time from the focusing operation start time setting unit 112, and at the same time, gives an instruction to the focus setting time measurement unit 111 and the recording operation end time setting unit 113 to start measuring the time. Then, the control microcomputer 108 obtains the position of the in-focus point selected by the user from the operation unit 109, displays a corresponding selection frame to the display unit 110, and stores the selected object position as the in-focus point.

When the user is determined not to have given any instruction to start selecting in-focus point in Step 402, the control microcomputer 108 waits for an instruction.

In Step 404, the control microcomputer 108 determines whether the user has given recording start instruction or not.

When the recording start instruction is determined to have been given, the control microcomputer 108 obtains the elapsed time from the recording operation end time setting unit 113, records the elapsed time as the recording operation end time, and causes the control to proceed to Step 405. When no recording start instruction is determined to have been given, the control microcomputer 108 returns the processing back to Step 402, so that the control microcomputer 108 repeats the setting operation of in-focus point according to an instruction of start of setting of in-focus point given by the user again. As a result, all the in-focus points and the in-focus control times thereof can be set before the start of recording, and this allows the user to avoid performing any operation with, e.g., keys, for setting in-focus point and the like during recording.

In Step 405, the control microcomputer 108 gives an instruction to start recording and waits until the focusing operation start time passes, and the control microcomputer 108 determines the drive amount of the focus lens based on the interval focusing time. After the focusing operation start time passes, the control microcomputer 108 causes the control to proceed to Step 406.

In Step 406, the control microcomputer 108 drives the focus lens based on the drive amount of the focus lens determined in Step 405. Then, when the interval focusing time passes, the driving is terminated, and the control microcomputer 108 causes the control to proceed to Step 407.

In Step 407, the control microcomputer 108 determines whether the focusing operation for all the set in-focus points has been finished or not. When the focusing operation for all the set in-focus points has been finished, the control microcomputer 108 causes the control to proceed to Step 408. When the focusing operation for all the set in-focus points has not yet been finished, the control microcomputer 108 causes the control to proceed to Step 405 to repeat the focusing operation to in-focus point.

In Step 408, the control microcomputer 108 waits until the recording operation end time passes. When the recording operation end time passes, the control microcomputer 108 gives an instruction to terminate recording.

With the above-described configuration, the in-focus state can be successively attained at plural points of the object without taking place manipulation of the key switches and the touch panel during picture taking, which causes camera vibration. In addition, when the focusing operation is automatically performed to change the current in-focus state to that of other arbitrary point, the in-focus time can be flexibly set like a manual focus operation, and this allows the user to take and record an image in which a blurred image obtained during in-focus operation is intentionally included.

Second Embodiment

Subsequently, the second embodiment of the present invention will be explained with reference to FIGS. 5 to 7. It should be noted that the configuration of the image pickup apparatus according to the present embodiment is the same as that of the first embodiment except that the touch panel is not used as the operation unit, and accordingly explanation of the configuration thereof is omitted here. The difference of the second embodiment from the first embodiment will be hereinafter mainly explained.

Figure 5:
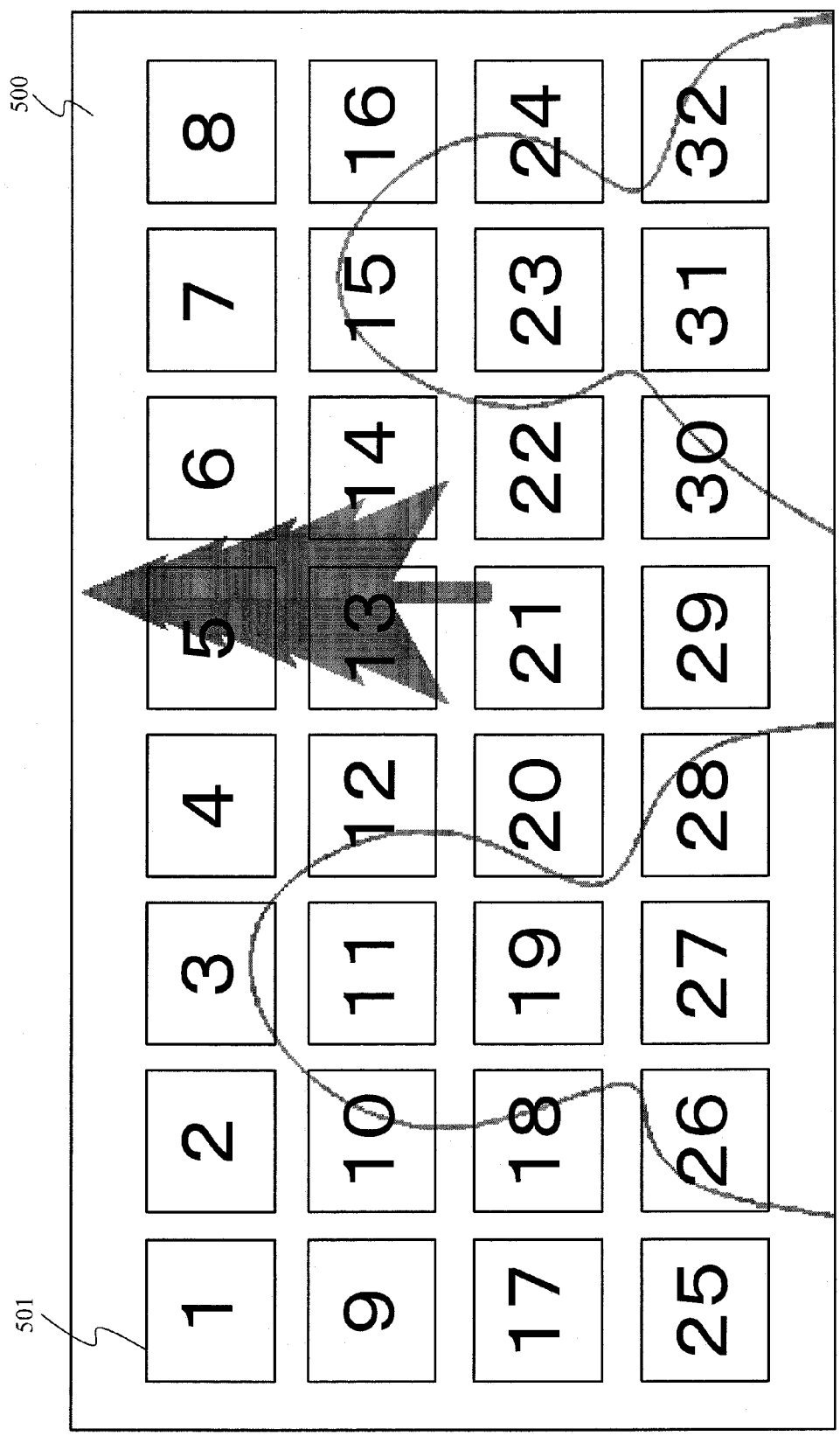
FIG. 5 is a figure illustrating an example of display of an in-focus point setting screen according to the second embodiment of the present invention.

FIG. 5 is a figure illustrating an example of display of an in-focus point setting screen according to the second embodiment of the present invention. FIG. 6 is a figure illustrating an example of display of a time setting screen according to the second embodiment of the present invention.

FIG. 5 is an example of display of in-focus point candidate frames 501 displayed on the display unit 110 when the operation unit 109 of the image pickup apparatus is not constituted by the touch panel but is constituted by key switches. The user manipulates the key switches to select a desired in-focus point candidate frame 501, and the control microcomputer 108 stores the selected in-focus point candidate frame as an in-focus point.

Figure 6:
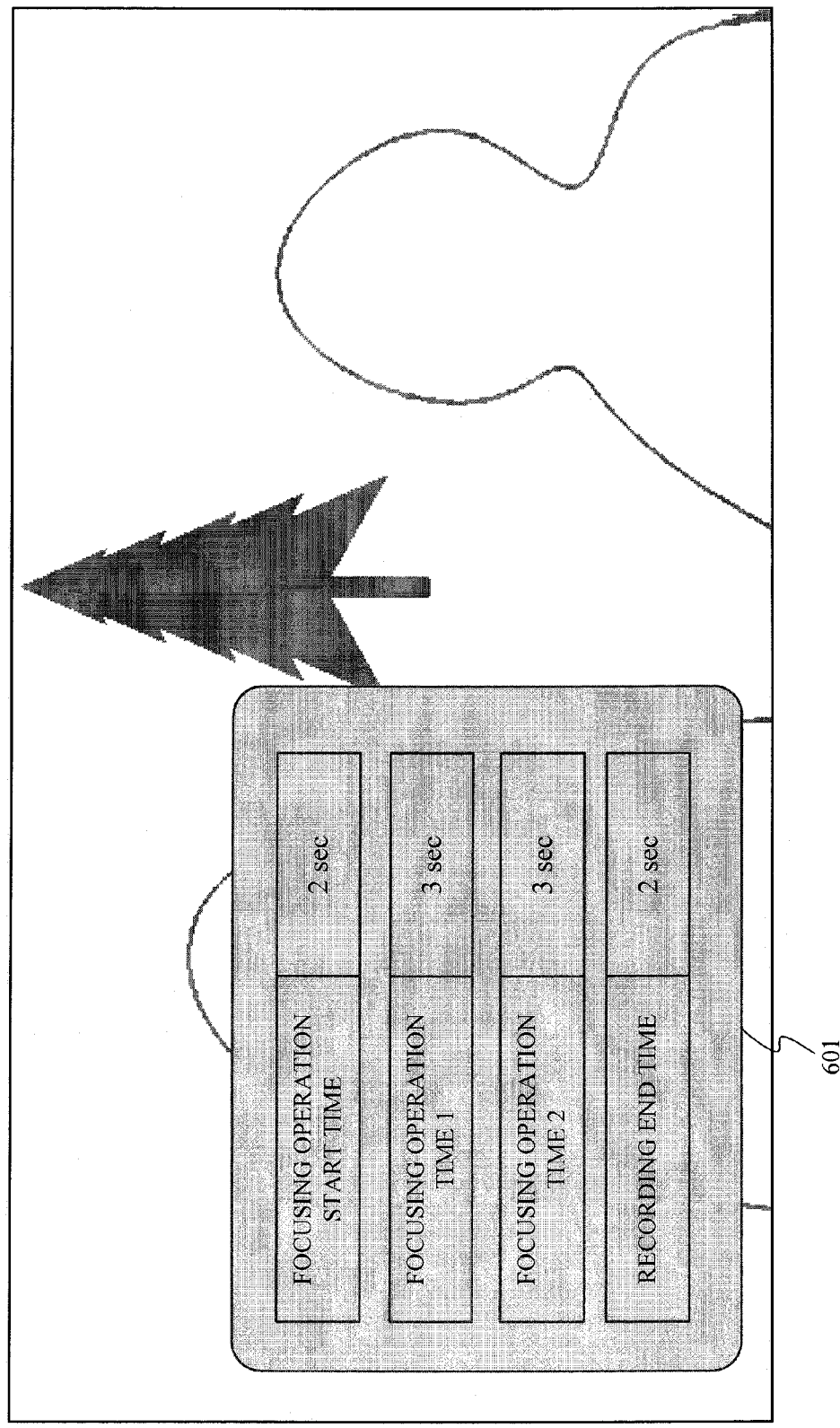
FIG. 6 is a figure illustrating an example of display of a time setting screen according to the second embodiment of the present invention.

At this occasion, as shown in FIG. 6, a mode is arranged to set a focusing operation start time (focusing operation start time in the figure), an interval focusing time (focusing operation time in the figure), and a recording operation end time. In this mode, a setting screen 601 is made, that is displayed to allow the user to set those times in advance. For example, in the setting screen, plural focusing operation times are set, and plural in-focus point candidate frames 501 can be selected and set in the screen of FIG. 5 correspondingly to the set plural focusing operation times.

When the user uses the operation unit 109 to set in-focus point and then gives an instruction to start recording, automatic focus operation is executed based on the focusing operation start time, the interval focusing time, the recording operation end time set in advance. As a result, the image during such a set period can be recorded as one clip.

FIG. 7 illustrates a flowchart of recording operation of the image pickup apparatus according to the second embodiment of the present invention.

This operation is achieved when the control microcomputer 108 loads and executes a program stored in a memory not shown. The recording operation routine according the present embodiment is started (activated) when the user makes the in-focus setting state effective.

In Step 701, the control microcomputer 108 displays the setting screen 601 showing the focusing operation start time, the interval focusing time, and the recording operation end time on the display unit 110 as shown in FIG. 6. The user inputs a desired time to each setting item. When the input is completed, the control microcomputer 108 causes the control to proceed to Step 702.

In Step 702, the control microcomputer 108 displays an in-focus point setting screen 500 as shown in FIG. 5. The user manipulates the key switches, and selects a desired in-focus point from displayed in-focus frames 501. At this occasion, when as many in-focus points as the number of interval focusing times selected in Step 701 are selected, the control microcomputer 108 stores the selected frame positions as in-focus points, and causes the control to proceed to Step 703. It should be noted that the in-focus frame 501 may be selected first, and various kinds of time settings corresponding thereto may be made.

In Step 703, the control microcomputer 108 gives an instruction to start recording, and causes the control to proceed to Step 704. In other words, in the present embodiment, the in-focus points and the in-focus control times thereof can also be set before the start of recording, and it is not required to perform any operation with, e.g., keys, for setting of in-focus point and the like during recording.

In Step 704, the control microcomputer 108 waits until the focusing operation start time passes, and determines the drive amount of the focus lens based on the interval focusing time. After the focusing operation start time passes, the control microcomputer 108 causes the control to proceed to Step 705.

In Step 705, the control microcomputer 108 drives the focus lens based on the drive amount of the focus lens determined in Step 704. When the interval focusing time passes, the control microcomputer 108 stops driving and causes the control to proceed to Step 706.

In Step 706, the control microcomputer 108 determines whether the focusing operation for all the in-focus points has been finished or not. When the focusing operation for all the in-focus points has been finished, the control microcomputer 108 causes the control to proceed to Step 707. When the focusing operation for all the in-focus points has not yet been finished, the control microcomputer 108 causes the control to return back to Step 704, and repeat the focusing operation to in-focus point.

In Step 707, the control microcomputer 108 waits until the recording operation end time passes, and when the recording operation end time passes, the control microcomputer 108 gives an instruction to terminating recording.

With the above-described configuration, even when the image pickup apparatus is not equipped with the touch panel, the in-focus state can be successively attained at plural points of the object without causing camera vibration due to manipulation of key switches while a picture is taken. When the focusing operation is automatically performed to change the current in-focus state to that of other arbitrary point, the in-focus time can be flexibly set as a manual focus operation, and this allows the user to take and record an image which intentionally includes a blurred image obtained during in-focus operation.

The present invention has been hereinabove explained in detail based on preferred embodiments thereof. However, the present invention is not limited to these particular embodiments, and various forms within the gist of this invention are also included in the present invention. A portion of the above embodiments may be combined as necessary.

The present invention also includes the following case. A program of software achieving the functions of the above embodiments are provided, directly or using wired/wireless communication, from a recording medium to a system or an apparatus having a computer capable of executing the program, and the program is executed.

Therefore, the present invention is also achieved by the program code itself provided and installed on the computer in order to achieve the function processing of the present invention with the computer. In other words, the computer program itself achieving the function processing of the present invention is also included in the present invention.

In this case, as long as the functions of the program are provided, the program may be in any form such as an object code, a program executed by an interpreter, and script data provided to the OS.

Examples of recording media for providing the program include a hard disk, a magnetic recording medium such as a magnetic tape, an optical/magneto-optical storage medium, and a semiconductor memory such as a non-volatile memory.

A method for providing the program is considered to be a method for causing a server on a computer network to store the computer program constituting the present invention and causing a connected client computer to download and program the computer program.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-273564, filed Dec. 8, 2010, which is hereby incorporated by reference herein in its entirety.

What is claimed is:

1. An image pickup apparatus comprising:
an image pickup unit configured to photograph an object;
a display unit configured to confirm the object photographed by the image pickup unit;
an optical system configured to change an in-focus state of the object;
a focus estimation unit configured to evaluate the in-focus state of the object;
a recording unit configured to record an image of the object photographed by the image pickup unit;
an operation unit configured to input an instruction to the image pickup apparatus;
a setting unit configured to select a plurality of points of the object displayed on the display unit in accordance with operation of the operation unit, and set the selected points as in-focus points; and
a control unit configured to set a focusing time for changing the in-focus state onto each set in-focus point by the optical system in accordance with the plurality of in-focus points being set by the setting unit, and control the change of the in-focus state by the optical system on the basis of the set in-focus time and the evaluation by the focus estimation unit in response to an instruction of recording given to the recording unit with the operation unit to make the plurality of set in-focus points into the in-focus state in turn.

2. The image pickup apparatus according to claim 1, wherein the control unit sets the in-focus time for each of the in-focus points.

3. The image pickup apparatus according to claim 1, wherein the in-focus time includes a time taken by the optical system to change the in-focus state and a waiting time before starting the change of the in-focus state.

4. The image pickup apparatus according to claim 3, wherein the control unit includes an in-focus point setting time measurement unit for respectively setting a waiting time and the time for changing the in-focus state, and sets the in-focus time on the basis of a time measured by the in-focus point setting time measurement unit in accordance with the operation of the operation unit.

5. The image pickup apparatus according to claim 1, wherein the control unit includes a recording operation end time setting unit for setting recording time from when the change of the in-focus state by the optical system has been finished with respect to the plurality of in-focus points to when the recording operation is finished, and controls the recording operation end time setting unit to set the recording time in accordance with an instruction of recording given with the operation unit.

6. The image pickup apparatus according to claim 1, wherein the operation unit includes a touch panel, and the touch panel is integrally formed with the display unit.

7. The image pickup apparatus according to claim 1, wherein the control unit displays an in-focus point setting screen,
the in-focus point setting screen includes an indication for setting the in-focus points and the in-focus times,
and the control unit sets the plurality of in-focus points and the in-focus times in accordance with the operation of the operation unit and the indication for setting the in-focus points and the in-focus times.

8. A control method for an image pickup apparatus comprising:
an image pickup unit configured to photograph an object;
a display unit configured to confirm the object photographed by the image pickup unit;
an optical system configured to change an in-focus state of the object;

a focus estimation unit configured to evaluate the in-focus state of the object;

a recording unit configured to record an image of the object photographed by the image pickup unit; and an operation unit configured to input an instruction to the image pickup apparatus, the control method comprising:

a setting step of selecting a plurality of points of the object displayed on the display unit in accordance with the operating of the operation unit, and setting the selected points as in-focus points; and a control step of setting a focusing time for changing the in-focus state onto each set in-focus point by the optical system according to the plurality of in-focus points being set in the setting step, and controlling the change of the in-focus state by the optical system on the basis of the set in-focus time and the evaluation by the focus estimation unit in response to an instruction of recording given to the recording unit with the operation unit to make the plurality of set in-focus points into the in-focus state in turn.

9. A non-transitory recording medium storing a program for a controlling an image pickup apparatus comprising:

an image pickup unit configured to photograph an object;

a display unit configured to confirm the object photographed by the image pickup unit;

an optical system configured to change an in-focus state of the object;

a focus estimation unit configured to evaluate the in-focus state of the object;

a recording unit configured to record an image of the object photographed by the image pickup unit; and an operation unit configured to input an instruction to the image pickup apparatus, wherein the program causing a computer to function as:

a setting unit configured to select a plurality of points of the object displayed on the display unit, in accordance with manipulation of the operation unit and set the selected points as in-focus points; and a control unit configured to set a focusing time for changing the in-focus state onto each set in-focus point by the optical system in accordance with the plurality of in-focus points being set by the setting unit, and control the change of the in-focus state by the optical system on the basis of the set in-focus time and the evaluation by the focus estimation unit in response to an instruction of recording given to the recording unit with the operation unit to make the plurality of set in-focus points into the in-focus state in turn.

* * * * *